(12) United States Patent
Monti

(10) Patent No.: US 8,967,015 B2
(45) Date of Patent: Mar. 3, 2015

(54) DEVICE FOR MOVING AND POSITIONING A MEMBER IN SPACE

(75) Inventor: Giuseppe Monti, Pianoro (IT)

(73) Assignee: Marchesini Group S.p.A., Pianoro (Bologna) (IT)

( * ) Notice: Subject to any disclaimer, the term of this patent is extended or adjusted under 35 U.S.C. 154(b) by 575 days.

(21) Appl. No.: 13/444,047

(22) Filed: Apr. 11, 2012

(65) Prior Publication Data

US 2012/0272773 A1 Nov. 1, 2012

(30) Foreign Application Priority Data

Apr. 26, 2011 (IT) .............................. BO2011A0221

(51) Int. Cl.
*B25J 18/00* (2006.01)
*B25J 17/02* (2006.01)

(52) U.S. Cl.
CPC ............ *B25J 17/0266* (2013.01); *Y10S 901/27* (2013.01)
USPC .......................................... 74/490.01; 901/27

(58) Field of Classification Search
USPC ....................... 74/490.01, 490.03; 901/23, 27
See application file for complete search history.

(56) References Cited

U.S. PATENT DOCUMENTS

| 4,976,582 | A |   | 12/1990 | Clavel |   |
|---|---|---|---|---|---|
| 5,941,128 | A | * | 8/1999 | Toyama et al. | ............ 74/490.06 |
| 2002/0015624 | A1 |   | 2/2002 | Wang et al. |   |
| 2005/0129495 | A1 | * | 6/2005 | Brogardh | ...................... 414/680 |
| 2011/0072929 | A1 | * | 3/2011 | Feng | ......................... 74/479.01 |
| 2012/0171383 | A1 | * | 7/2012 | Christensen et al. | ...... 427/427.3 |

FOREIGN PATENT DOCUMENTS

| DE | 10 2008 025845 A1 | 12/2009 |
|---|---|---|
| EP | 1 878 544 A1 | 1/2008 |

OTHER PUBLICATIONS

European Search Report for corresponding EP application No. 12 16 3553, dated Jul. 27, 2012, 3 pages.

* cited by examiner

*Primary Examiner* — William Kelleher
*Assistant Examiner* — Terence Boes
(74) *Attorney, Agent, or Firm* — William J. Sapone; Ware Fressola Maguire & Barber LLP

(57) ABSTRACT

A device (1) for moving and positioning a member in space has a mobile member (2), first and second members (3, 4) attached to a frame (32), and first and second carriages (5, 6) slidable along the members (3, 4). A first pair of arms (7, 8) are hinged to the first carriage and to the mobile member, forming a first four-bar linkage. A second pair of arms (10, 11) are hinged to the second carriage (6) and to the mobile member, forming a second four-bar linkage. A third pair of arms (14, 15) are hinged to a third member (13) and to the mobile member (2), forming a third four-bar linkage. A fourth member (17) which is hinged to the frame (3, 4, 19, 32) of the device (1) rotatably bears the third member (13), with a first actuator (18) provided for moving the fourth member (17).

8 Claims, 5 Drawing Sheets

DEVICE FOR MOVING AND POSITIONING A MEMBER IN SPACE

FIELD OF THE INVENTION

The present invention relates to the technical sector of devices for moving and positioning a member in three-dimensional space; in particular, the invention relates to a parallel robot.

DESCRIPTION OF THE PRIOR ART

Parallel robots are also known as parallel handlers.

A parallel robot comprises a frame and a mobile platform connected to the frame by means of a certain number of bar-linkage mechanisms; these mechanisms are moved by actuators, for example electric motors, mounted on the frame.

The mobile platform can thus move in three-dimensional space within a predetermined working volume, usually maintaining the same orientation all the time (for example horizontal).

The parallel robot also comprises an operating head for handling products (for example pharmaceuticals or cosmetics) borne by the mobile platform, for operating internally of the work volume. Further, the operating head can modify its orientation with respect to the mobile platform thanks to the motion received from at least an additional actuator mounted on the frame of the robot.

An example of a parallel robot of the above-described type is disclosed in U.S. Pat. No. 4,976,582.

Another parallel robot of known type comprises: a mobile platform; a first upright, a second upright, and a third upright arranged as the vertices of an equilateral triangle; a first carriage sliding along the first upright, a second carriage sliding along the second upright, a third carriage sliding along the third post upright; a first pair of arms comprising a first arm and a second arm, the first arm and the second arm being hinged at a relative end thereof to the first carriage and at the other end to the moving platform, the first pair of arms, the first carriage and the mobile platform identifying a first bar linkage; a second pair of arms comprising a third arm and a fourth arm, the third arm and the fourth arm being hinged at a relative end thereof to the second carriage and, at the other end, to the moving platform; the second pair of arms, the second carriage and the mobile platform identifying a second bar linkage, and a third pair of arms comprising a fifth arm and a sixth arm, the fifth arm and the sixth arm being hinged at a relative end thereof to the third carriage and at the other end to the moving platform, the third pair of arms, the third carriage and the mobile platform identifying a third bar linkage; a first electric motor which moves the first carriage; a second motor electric which moves the second carriage, and a third electric motor which moves the third carriage.

In this way, the mobile platform can move in a predetermined work volume, for example while maintaining an orientation that is constantly horizontal.

The parallel robot also comprises: an operating head for manipulating products that are located in the working volume, and a fourth motor mounted on the first carriage; a first additional arm which transmits the motion of the rotary output shaft of the fourth motor to the operating head by means of two universal joints arranged at the end of the first additional arm; a fifth motor mounted on the second carriage, a second additional arm which transmits the motion of the rotary output shaft of the fifth motor to the operating head by means of two universal joints arranged at the ends of the second additional arm; a sixth motor mounted on the third carriage; a third arm additional which transmits the motion of the rotary output shaft of the sixth motor to the operating head by means of two universal joints arranged at the ends of the third additional arm.

In this way, the operating head has six degrees of freedom, so it can operate internally of the above-cited working volume.

A drawback of this parallel robot consists in the fact that the arrangement of the three uprights poses problems of visibility of the working volume as well as accessibility thereto.

SUMMARY OF THE INVENTION

The aim of the present invention consists in obviating the above described drawback.

The stated aim is attained by a parallel robot comprising:
a mobile member;
a first member, solidly constrained to a frame of the device (1) and a second member solidly constrained to the frame of the device;
a first carriage slidable along the first member;
a second carriage slidable along the second member;
a first pair of arms comprising a first arm and a second arm, the first arm and the second arm being hinged, at an end thereof, to the first carriage and, at another end thereof, to the mobile member, the first pair of arms, the first carriage and the mobile member identifying a first four-bar linkage;
a second pair of arms comprising a third arm and a fourth arm, the third arm and the fourth arm being hinged, at an end thereof, to the second carriage and, at another end thereof, to the mobile member, the second pair of arms, the second carriage and the mobile member identifying a second four-bar linkage;
a third member; a third pair of arms comprising a fifth arm and a sixth arm, the fifth arm and the sixth arm being hinged, at an end thereof, to the third member and, at another end thereof, to the mobile member, the third pair of arms, the third member and the mobile member identifying a third four-bar linkage;
characterized in that it further comprises: a fourth member which is hinged to the frame of the device and which rotatably bears the third member; a first actuator for moving the fourth member.

With reference to the prior-art example cited above, the third member can be identified in the third carriage which slides along the third upright so as to move the third bar linkage.

In the invention, the third member is rotatably borne by the fourth member, which is hinged to the frame and is activatable by the first actuator.

It is advantageously no longer necessary to have a third upright and a third carriage that slides along it: for this reason, the lack of the third upright improves visibility and accessibility in the working volume.

The first member is preferably a first upright and the second member is a second upright.

The device preferably comprises a crossbar fixed to the first upright and the second upright, which crossbar rotatably bears the fourth member. The frame of the device can thus comprise a portal conformation, which optimizes the visibility and the accessibility of the loading volume.

In accordance with an embodiment, the device comprises a ninth arm and a second actuator, the ninth arm being hinged to the frame and to the second actuator, the second actuator being hinged to the ninth arm and the fourth member, the second actuator, the ninth arm, the fourth member and the frame identifying a fourth bar linkage.

The ninth arm and the fourth member are in particular hinged to the fixed part, or frame, of the second actuator.

As is known, a four bar linkage comprises four sides hinged to each other, each side being of identical length to the opposite side, in any position that can be assumed by the bar linkage, the opposite sides remain constantly parallel to each other.

In the above-mentioned embodiment, the sides of the fourth bar linkage can be considered as the joining lines of its hinge points; therefore a first side is associated to the fourth member, a second side, opposite the first, is associated to the ninth arm, a third side is associated to the second actuator and a fourth side, opposite the third side, is associated to the frame. The first side and second side are opposite and of equal length; the same applies to the third side and the fourth side.

Since the fourth side is associated to the frame, it remains fixed; the third side must remain parallel to the fourth side, i.e. it must constantly maintain the same orientation; this means that also the second actuator constantly maintains the same orientation, since the third side is associated to the second actuator.

The second actuator, therefore, can move in space as a result of the actuation of the first actuator, which moves the fourth member and, therefore, also the third bar linkage and the fourth bar linkage; however, as mentioned above, the second actuator advantageously always maintains the same orientation in space, which for example can be vertical.

The second actuator can be an electric motor and provide motion to an operating head mounted on the mobile member through a connecting arm having two universal joints, for example.

The second actuator advantageously carries out the same task that in the prior art was performed by the sixth motor mounted on the third carriage. If the device also comprises a fourth motor mounted on the first carriage and a fifth motor mounted on the second carriage to provide respectively two additional separate drives to the operating head, as described in the introduction, then the device according to the invention will have an operating head with six degrees of freedom.

DESCRIPTION OF PREFERRED EMBODIMENTS

Specific embodiments of the invention will be described in the following of the present description, according to what is set out in the claims and with the aid of the accompanying tables of drawings, in which:

DESCRIPTION OF PREFERRED EMBODIMENTS

Figure 1A:
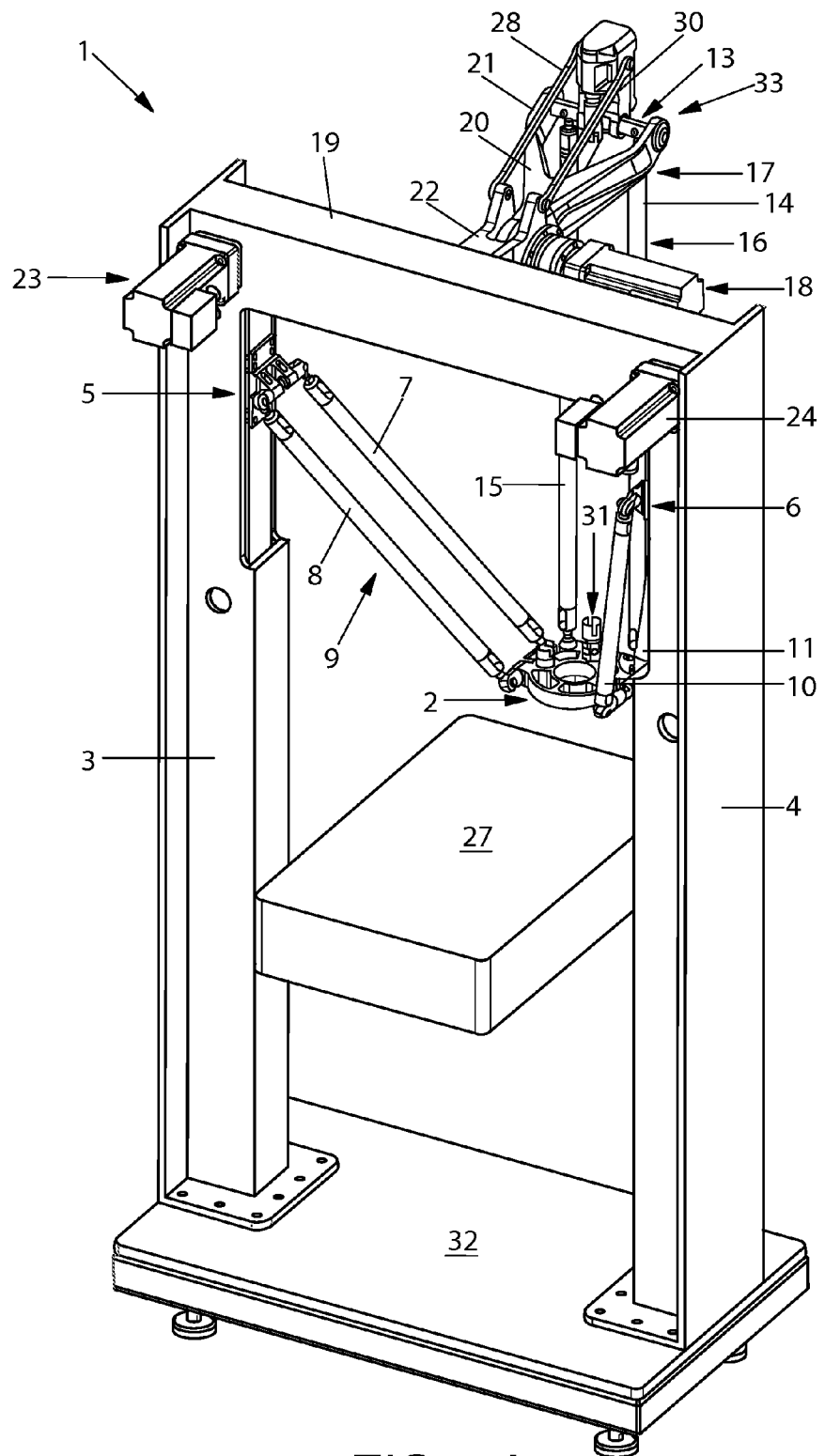
FIGS. 1A, 1B illustrate two different perspective views of the device of the present invention.
Figure 1B:
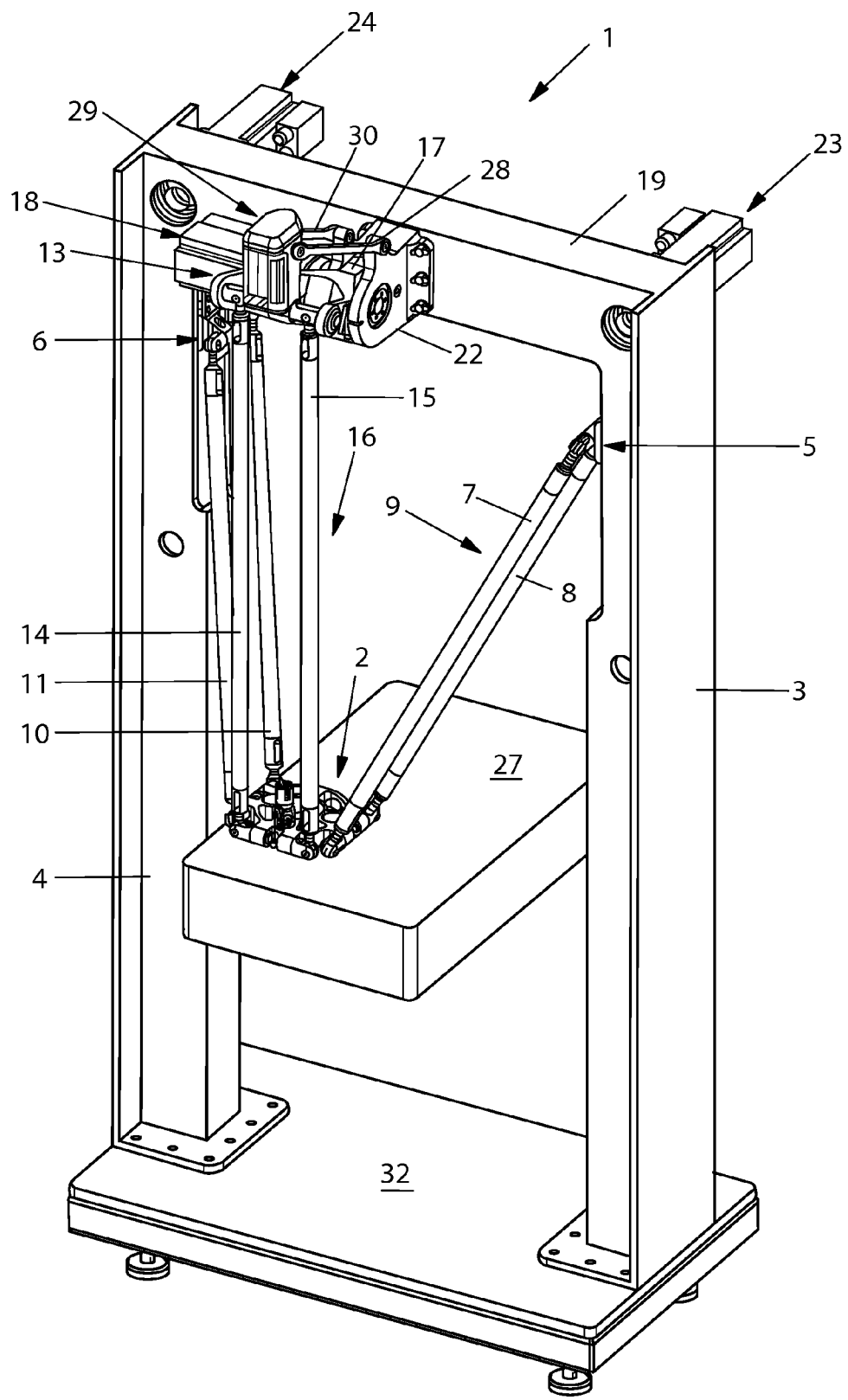
Figure 2:
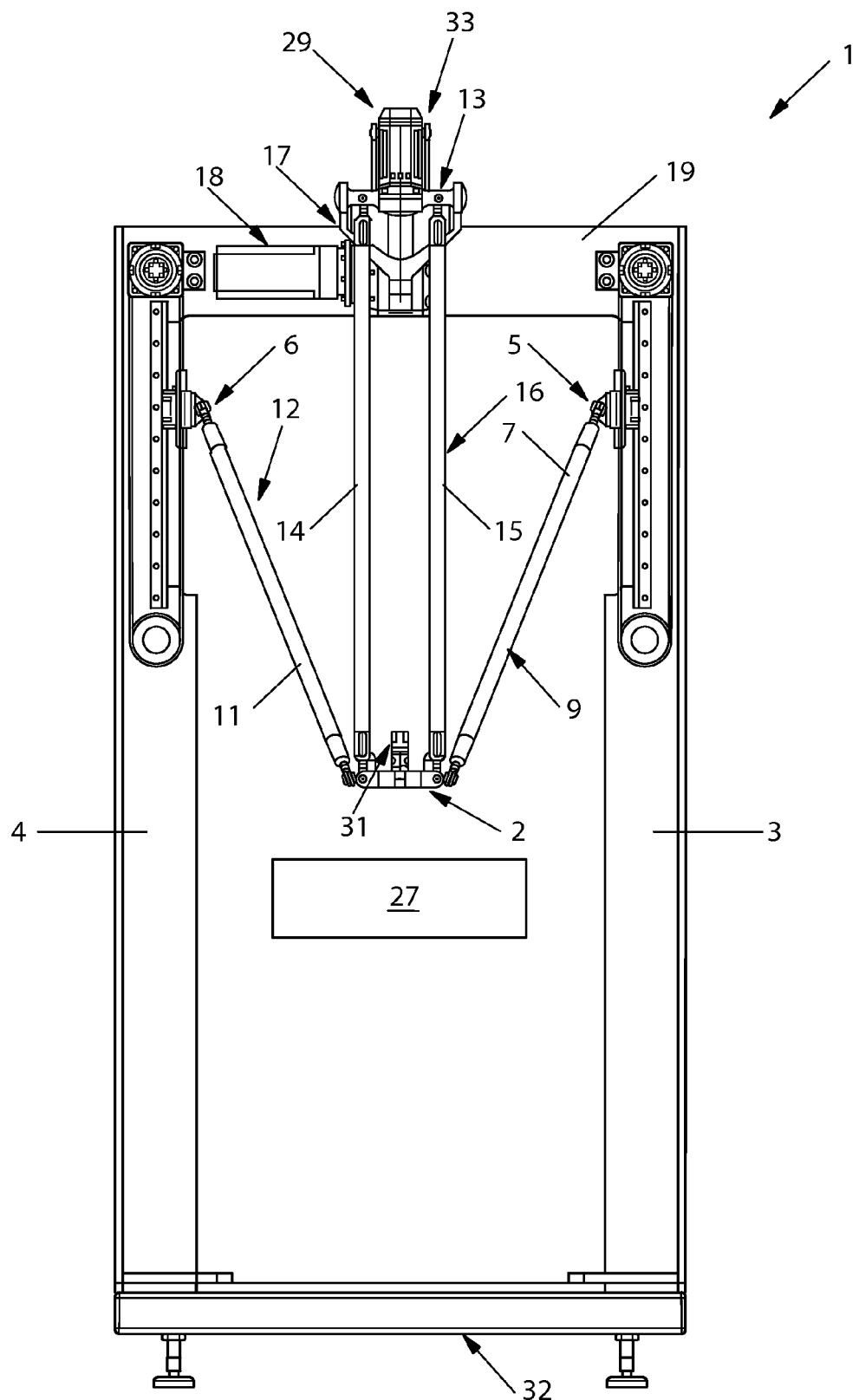
FIGS. 2, 3 are respectively a frontal and lateral view of the device of FIGS. 1A, 1B.

With reference to the accompanying tables of drawings, (1) denotes a device for moving and positioning a member in space, the object of the present invention, comprising:

- a mobile member (2), having for example the shape of a platform (in the following the term mobile platform may also be used);
- a first member (3), solidly constrained to a frame (32) of the device (1) and a second member (4) solidly constrained to the frame (32) of the device (1);
- a first carriage (5) slidable along the first member (3);
- a second carriage (6) slidable along the second member (4); a first pair of arms (7, 8) comprising a first arm (7) and a second arm (8), the first arm (7) and the second arm (8) being hinged, at a relative end thereof, to the first carriage (5) and, at another end thereof, to the mobile member (2), the first pair of arms (7, 8), the first carriage (5) and the mobile member (2) identifying a first four-bar linkage (9);
- a second pair of arms (10, 11) comprising a third arm (10) and a fourth arm (11), the third arm (10) and the fourth arm (11) being hinged, at an end thereof, to the second carriage (6) and, at another end thereof, to the mobile member (2), the second pair of arms (10, 11), the second carriage (6) and the mobile member (2) identifying a second four-bar linkage (12);
- a third member (13); a third pair of arms (14, 15) comprising a fifth arm (14) and a sixth arm (15), the fifth arm (14) and the sixth arm (15) being hinged, at an end thereof, to the third member (13) and, at another end thereof, to the mobile member (2), the third pair of arms (14, 15), the third member (13) and the mobile member (2) identifying a third four-bar linkage (16);
- a fourth member (17) which is hinged to the frame (3, 4, 19, 32) of the device (1) and which rotatably bears the third member (13); a first actuator (18) for moving the fourth member (17), for example an electric motor.

The first member (3) can comprise a first upright (3), while the second member (4) can comprise a second upright (4). Preferably, the first member (3) is the first upright (3), while the second member (4) is the second upright (4).

The device (1) can comprise a crossbar (19) fixed at an end to the first upright (3) and at the other end to the second upright (4), which crossbar (19) rotatably bears the fourth member (17). The crossbar (19) is preferably fixed to the top of the first upright (3) and the second upright (4). The assembly formed by the first upright (3), the second upright (4) and the crossbar (19) thus conforms a portal. The portal can also be a single body, as illustrated in the figures. The crossbar (19) can rotatably bear the fourth member (17) by means of a first structural element (2), as illustrated in the figures.

The first actuator 18 is preferably mounted on the crossbar 19.

The frame of the device 1 comprises a base (32). The first upright and the second upright (4) are inferiorly fixed to the base (32) in particular, the above-defined portal can be considered an integral part of the device (1) frame.

Preferably, the third member (13) comprises a seventh arm (13) hinged to the third pair of arms (14, 15) and hinged to the fourth member (17). The fourth member (17) preferably comprises an eighth arm (17). For example, the eighth arm (17) is provided with a fork (20), the prongs (21) of which are hinged to the seventh arm (13). The eighth arm (17) is also hinged to the first structural element (22).

The device (1) further comprises a third actuator (23), for example an electric motor, for moving the first carriage (5). The third actuator (23) is mounted for example on the beam (19), or on the first upright (3). The device (1) also comprises a fourth actuator (24), for example an electric motor, for moving the second carriage (6). The fourth actuator (24) is mounted for example on the beam (19), or on the second upright (4).

In an embodiment of the invention, the device (1) comprises a ninth arm (28) and a second actuator (29), the ninth arm (28) being hinged to the frame of the device (1) and to the second actuator (29), the second actuator (29) being hinged to the ninth arm (28) and the fourth member (17), the second actuator (29), the ninth arm (28), the fourth member (17) and the frame of the device (1) identifying a fourth bar linkage (33). In the example illustrated in the figures, in particular, the ninth arm (28) is hinged to the first structural element (22), solidly constrained to the frame of the device (1). The first structural element (22) can be considered an integral part of the frame of the device (1).

In the example shown in the figures, a tenth arm (30) is also provided, having the same function as the ninth arm (28). The tenth arm (30) is hinged to the first structural element (22) and to the second actuator (29). However, a device (1) can be designed in which the tenth arm (30) is not necessary.

Figure 3:
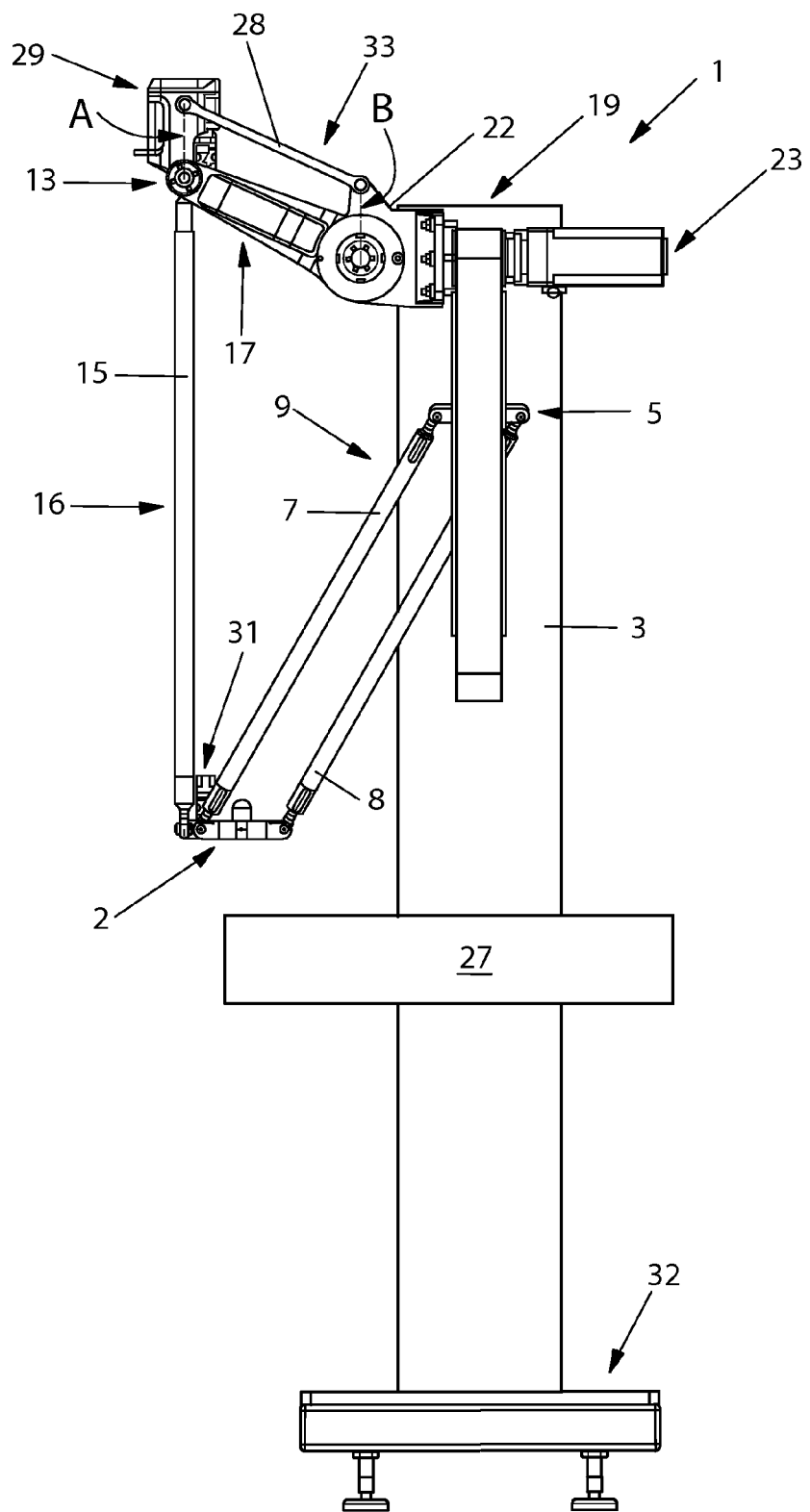
Figure 4:
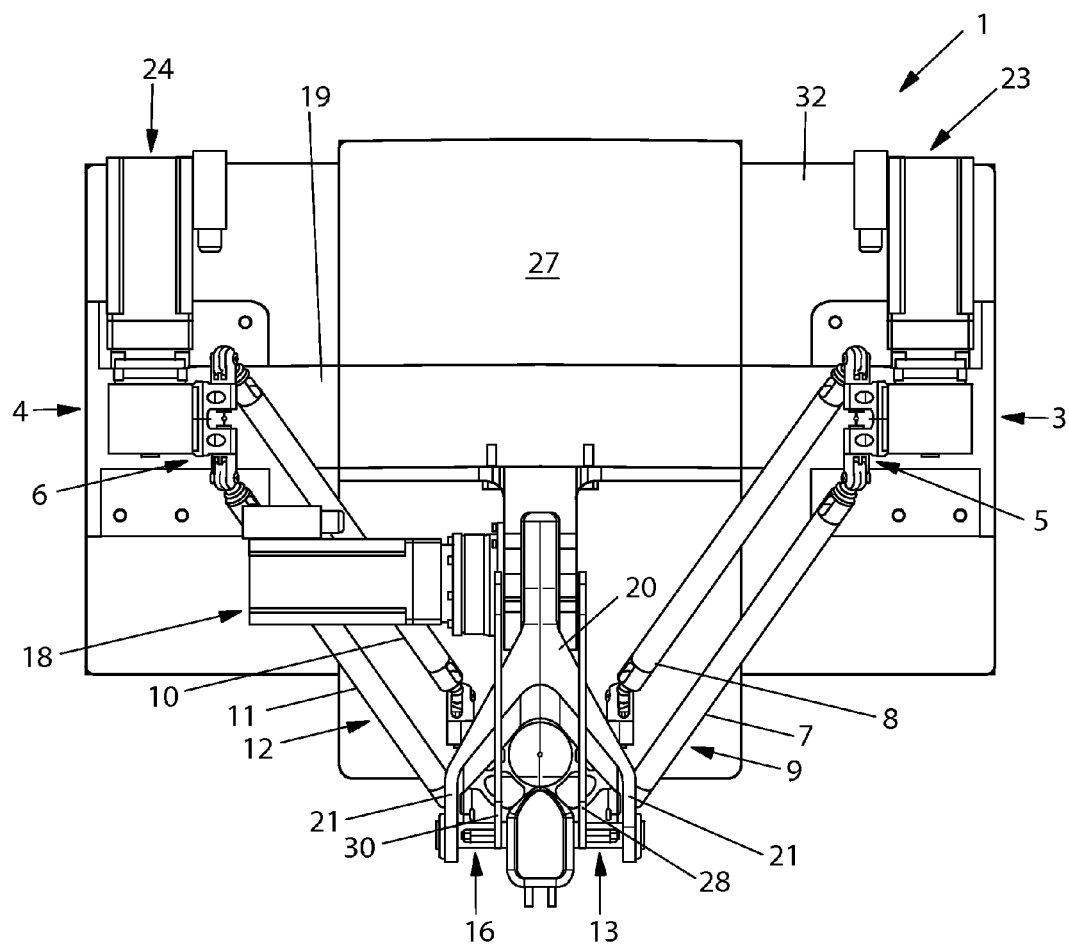
FIG. 4 is a view from above, in larger scale, of the device of FIGS. 1A, 1B.

The line (indicated by dashed lines in FIG. 3 with the reference A) joining the hinge point of the second actuator (29) to the ninth arm (28) with the hinge point of the second actuator (29) with the eighth arm (17) is preferably vertical. The joining line (A) remains constantly vertical due to the fact that the joining line is vertical (denoted by dashed lines in FIG. 3 by reference B) of the hinge point of the ninth arm (28) to the first structural element (22) with the hinge point of the fourth member (17) with the first structural element (22).

The first carriage (5) is shaped so as to hinge to the first arm (7) and the second arm (8); the first carriage (5) slides along the first upright (3) in a vertical direction, moved by the third actuator (23). The first carriage (5) is shaped so that the line (hereinafter referred to as the first joining line) joining the points of articulation of the first pair of arms (7, 8) with the first carriage (5) itself is horizontal.

The mobile platform (2) is substantially planar. The pivot points of the mobile platform (2) with the first pair of arms (7, 8) are located at the end of a first side of the mobile platform (2). The presence of the first bar linkage means that the first side of the mobile platform (2) is constantly parallel to the first joining line, and therefore is constantly horizontally orientated.

Figure 5:
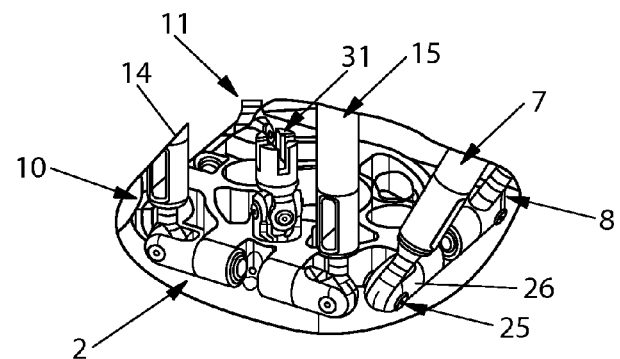
FIG. 5 is a view of a detail of the device of FIGS. 1A, 1B.

With reference to FIG. 5, the first arm (7) has an end provided with a through hole (not visible) for receiving a pin (25) borne by a second structural element (26), which in turn is rotatably supported by the mobile platform (2). The hinge is realized in such a way two degrees of freedom are allowed between the first arm (7) and the mobile platform (2).

At least some of the joints mentioned above can be obtained in this way, or alternatively, it is possible to use ball joints, for example.

The second carriage (6) is shaped so as to hinge with the third arm (10) and the fourth arm (11), the second carriage (6) slides along the second upright (4) in the vertical direction, moved by the fourth actuator (24). The second carriage (6) is conformed such that the line (hereinafter referred to as a second joining line) joining the hinge points of the second pair of arms (10, 11) with the second carriage (6) is horizontal.

The hinge points of the mobile platform (2) with the second pair of arms (10, 11) are located at the end of a second side of the mobile platform (2). The presence of the second bar linkage means that this second side of the mobile platform (2) is constantly parallel to the second joining line and thus is constantly horizontally orientated.

The seventh arm (13) is hinged to the prongs (21) of the fork (20) of the eighth arm (17) at the ends.

The seventh arm (13) can perform only an arched trajectory, as it is moved by the eighth arm (17), which is actuated by the first actuator (18). The device (1) is designed so that during its trajectory the seventh arm (13) is kept constantly with a horizontal orientation, as shown in the figures.

The line (hereinafter referred to as third joining line) joining the hinge points of the third pair of arms (14, 15) with the seventh arm (13) is parallel to the axis of the seventh arm (13).

The hinge points of the mobile platform (2) with the third pair of arms (14, 15) are located at the end of a third side of the mobile platform (2). The presence of the third parallelogram linkage means that this third side of the platform the mobile (2) is constantly parallel to the third joining line, i.e. to the seventh arm (13). Since the seventh arm (13) remains constantly horizontal during its trajectory, the third side too of the platform remains accordingly horizontal.

Since the first side, the second side and the third side must always remain horizontal, it follows that the mobile platform (2) always maintains a horizontal orientation.

The mobile platform (2) can act in a predetermined working volume, denoted by the reference number (27) in the figures, maintaining a constantly horizontal orientation.

The device (1) in the object can be identified as a parallel robot.

The device (1) in question also includes: an operating head (not shown) for manipulating products (not shown) that are located in the working volume (27); a first additional arm (not shown) which transmits the motion of the rotating output shaft of the second actuator (29) to the operating head by means of two universal joints (of which only one, denoted by reference number 31, has been represented by way of example in the figures) arranged at the ends of the first additional arm; a fifth actuator (not shown) mounted on the first carriage (5), a second additional arm (not shown) which transmits the motion of the rotary output shaft of the fifth actuator to the operating head by means of two universal joints (not shown) arranged at the ends of the additional second arm; a sixth actuator (not shown) mounted on the second carriage (6), a third additional arm (not shown) which transmits the motion of the rotary output shaft of the sixth actuator to the operating head by means of two universal joints (not illustrated) arranged at the ends of the third additional arm.

In this manner, the working head has six degrees of freedom, being able to operate within the working volume (27) mentioned above.

It is understood that what above has been described by way of non limiting example, and any possible constructive variants are understood to fall within the ambit of protection of the present technical solution, as claimed in the following.

The invention claimed is:

1. A device (1) for moving and positioning a member in space, comprising:
    a mobile member (2);
    a first member (3), solidly constrained to a frame (32) of the device (1) and a second member (4) solidly constrained to the frame (32) of the device (1);
    a first carriage (5) slidable along the first member (3);
    a second carriage (6) slidable along the second member (4);
    a first pair of arms (7, 8) comprising a first arm (7) and a second arm (8), the first arm (7) and the second arm (8) being hinged, at an end thereof, to the first carriage (5) and, at another end thereof, to the mobile member (2), the first pair of arms (7, 8), the first carriage (5) and the mobile member (2) identifying a first four-bar linkage (9);
    a second pair of arms (10, 11) comprising a third arm (10) and a fourth arm (11), the third arm (10) and the fourth arm (11) being hinged, at an end thereof, to the second carriage (6) and, at another end thereof, to the mobile member (2), the second pair of arms (10, 11), the second carriage (6) and the mobile member (2) identifying a second four-bar linkage (12);

a third member (13);

a third pair of arms (14, 15) comprising a fifth arm (14) and a sixth arm (15), the fifth arm (14) and the sixth arm (15) being hinged, at an end thereof, to the third member (13) and, at another end thereof, to the mobile member (2), the third pair of arms (14, 15), the third member (13) and the mobile member (2) identifying a third four-bar linkage (16);

a fourth member (17) which is hinged to the frame (3, 4, 19, 32) of the device (1) and which rotatably bears the third member (13); and, a first actuator (18) for moving the fourth member (17).

2. The device (1) of claim 1, wherein the first member (3) comprises a first upright (3) and wherein the second member (4) comprises a second upright (4).

3. The device (1) of claim 2, further comprising a crossbar (19) fixed to the first upright (3) and to the second upright (4), which crossbar (19) rotatably bears the fourth member (17).

4. The device (1) of claim 3, wherein the first actuator (18) is mounted on the crossbar (19).

5. The device (1) of claim 1, wherein the third member (13) comprises a seventh arm (13) hinged to the third pair of arms (14, 15), and wherein the fourth member (17) comprises an eighth arm (17) provided with a fork (20), tines (21) of the fork (20) being hinged to the seventh arm (13).

6. The device (1) of claim 1, wherein the first actuator (18) is an electric motor.

7. The device (1) of claim 1, further comprising a ninth arm (28) and a second actuator (29), the ninth arm (28) being hinged to the frame (3, 4, 19, 32) of the device (1) and to the second actuator (29), the second actuator (29) being hinged to the ninth arm (28) and to the fourth member (17), the second actuator (29), the ninth arm (28), the fourth member (17) and the frame (3, 4, 19, 32) of the device (1) identifying a fourth four-bar linkage (33).

8. The device (1) of claim 7, wherein the line conjoining the hinge point of the second actuator (29) with the ninth arm (28) and the hinge point of the second actuator (29) with the fourth member (17) is vertical.

* * * * *